US005969061A

United States Patent [19]
Wonders et al.

[11] Patent Number: 5,969,061
[45] Date of Patent: *Oct. 19, 1999

[54] SUPPRESSION OF FINES IN A FLUID BED POLYETHYLENE PROCESS

[75] Inventors: Alan George Wonders; Glenn Edward Moore; Randal Ray Ford; Jeffrey Daniel Daily; Kenneth Alan Dooley; Jesus Jose Garcia, all of Longview, Tex.

[73] Assignee: Eastman Chemical Company, Kingsport, Tenn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/724,805

[22] Filed: Oct. 2, 1996

Related U.S. Application Data

[60] Provisional application No. 60/005,374, Oct. 16, 1995.

[51] Int. Cl.$^6$ ........................................ C08F 2/34
[52] U.S. Cl. .............................. 526/68; 526/66; 526/74; 526/78; 526/79; 526/901
[58] Field of Search ................................... 526/66, 68, 74, 526/78, 79

[56] References Cited

U.S. PATENT DOCUMENTS

| | | | |
|---|---|---|---|
| 4,532,311 | 7/1985 | Fulks et al. | 526/62 |
| 4,803,251 | 2/1989 | Goode et al. | 526/59 |
| 4,882,400 | 11/1989 | Dumain et al. | 526/88 |
| 4,933,149 | 6/1990 | Rhee et al. | 422/131 |
| 4,956,427 | 9/1990 | Jenkins, III et al. | 526/62 |
| 5,126,414 | 6/1992 | Cooke et al. | 526/68 |
| 5,352,749 | 10/1994 | DeChellis et al. | 526/68 |
| 5,405,922 | 4/1995 | DeChellis et al. | 526/68 |
| 5,428,118 | 6/1995 | Painter et al. | 526/88 |
| 5,461,123 | 10/1995 | Song et al. | 526/88 |
| 5,462,999 | 10/1995 | DeChellis et al. | 526/68 |

FOREIGN PATENT DOCUMENTS

| | | |
|---|---|---|
| 089 691 | 9/1983 | European Pat. Off. . |
| 0453116A1 | 10/1991 | European Pat. Off. . |
| 571 826 A2 | 5/1992 | European Pat. Off. . |
| 0604990A1 | 7/1994 | European Pat. Off. . |

OTHER PUBLICATIONS

P. Galli "The 'Spherilene' Process", paper S4A, *Polyethylene—The 1990s and Beyond,* The Plastics and Rubber Institute (UK), (1992).

I. D. Burdett in "A Continuing Success: The UNIPOL Process", pp. 616–623, *CHEMTECH,* Oct. 1992.

R. A. Hutchinson and W. H. Ray "Polymerization of Olefins through Heterogeneous Catalysis. VIII. Monomer Sorption Effects", *Journal of Applied Polymer Science,* vol. 41, 51–81.

*Primary Examiner*—David W. Wu

[57] ABSTRACT

Disclosed is a method for controlling or reducing the amount of powder fines present in a polyethylene fluidized bed reactor. The method uses hydrocarbons that are inert with respect to the polymerization reaction, as well as using reactive olefins. The reduction of powder fines provides significant operating benefits in the fluid bed process, including reduced formation of powder agglomerates in the reactor and reduced fouling of equipment in the recycle gas stream.

13 Claims, 6 Drawing Sheets

Effect of Hexane on Median Particle Size

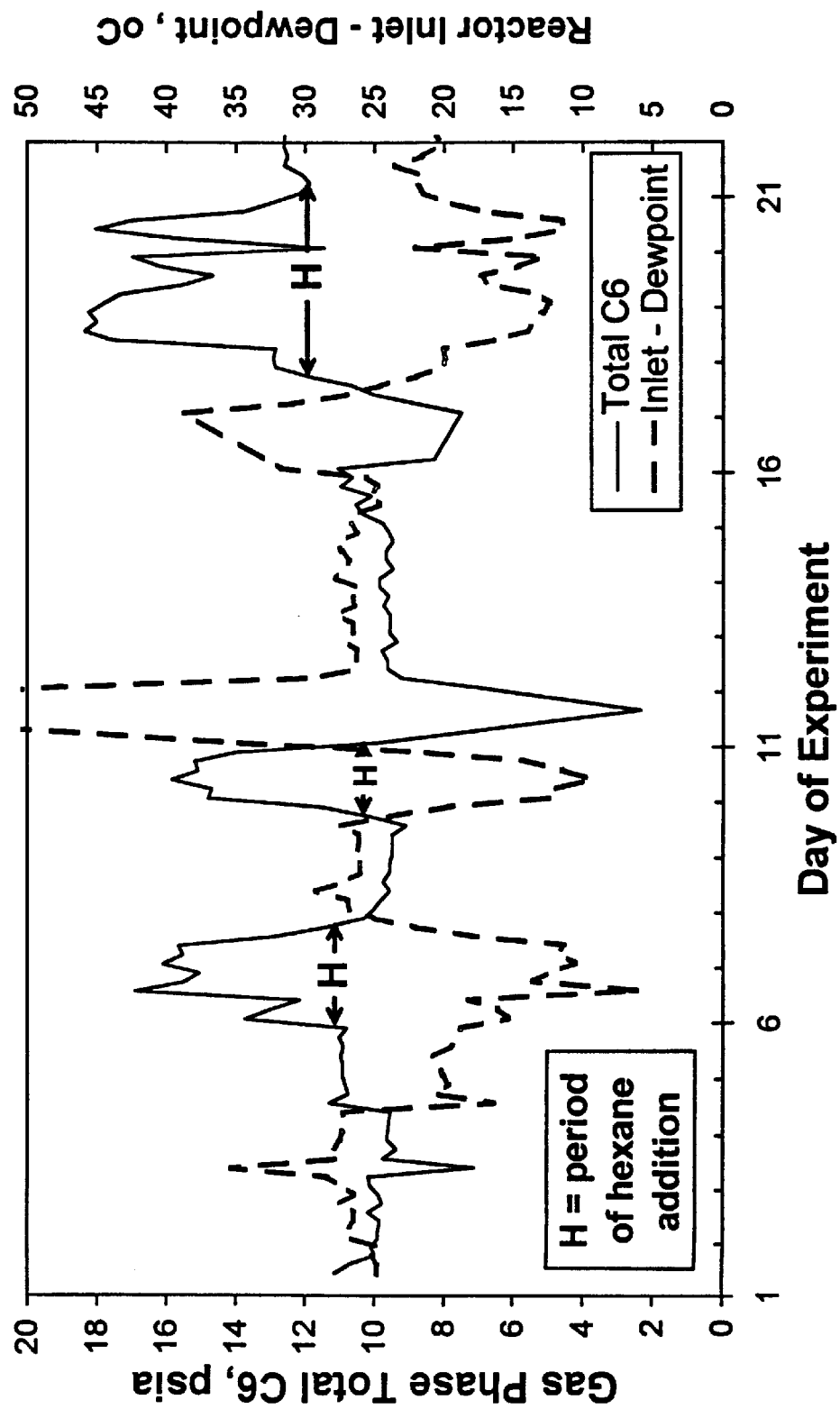

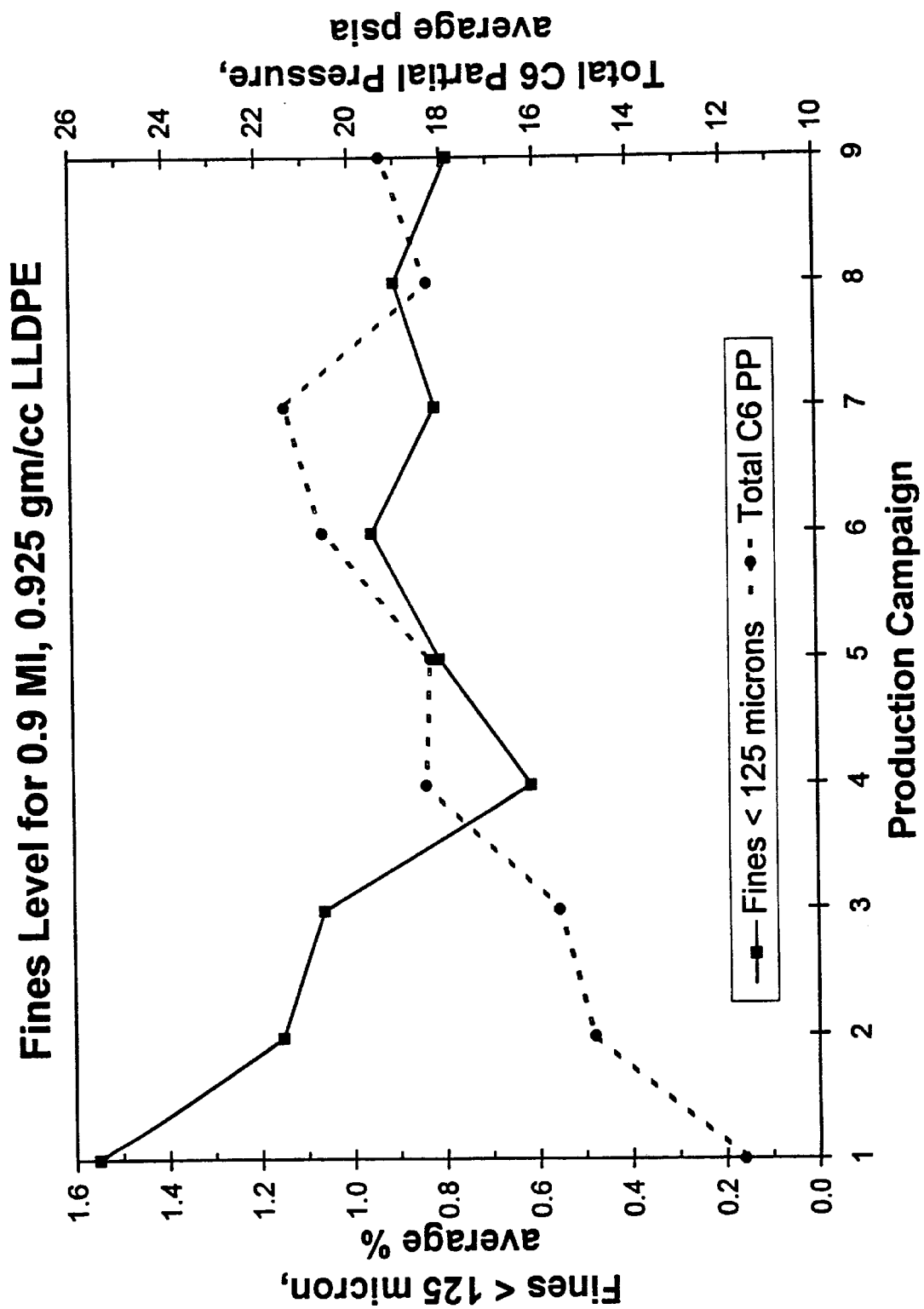

SUPPRESSION OF FINES IN A FLUID BED POLYETHYLENE PROCESS

This is an ORIGINAL application based on the PROVISIONAL Ser. No. 60/005,374 filed Oct. 16, 1995.

FIELD OF THE INVENTION

The present invention relates to a process for the reduction or suppression of powder fines in a fluid bed polyethylene process. More particularly, the present invention relates to a process for the reduction or control of fines to a low level in a polyethylene production process of a fluid bed reactor through the introduction of additional hydrocarbons.

BACKGROUND OF THE INVENTION

It is well known that many polymers can be produced as powders in fluid bed reactors wherein the fluidization is provided by a circulating mixture of gases that includes the monomers. This technology is widely used commercially for polyolefins and polyolefin copolymers. One particularly useful arrangement of a fluid bed polyolefin process is disclosed in U.S. Pat. No. 4,882,400. Other examples of fluid bed polyolefin technology are demonstrated in the references that follow.

The active, growing powder in a fluidized bed polyolefin reactor is composed of a wide range of particle sizes. Thus, this powder is referred to as having a broad particle size distribution. Some of the reasons for this broad size distribution are the size range of the initial catalyst particles (or prepolymer particles) charged to the reactor, the difference in catalytic activity of each catalyst particle, the difference in residence time for each growing polymer particle, the agglomeration of polymer particles, and the spalling of polymer particles.

The size distribution of particles can be characterized by various physical measurements relating to the particle mass, physical dimensions, or specific surface area. Two commonly used methods of measurement, owing to ease and reproducibility, are mechanical sieve analysis and the light scattering behavior of a cloud of particles. The very small polymer particles are called fines. As used in the art, the term "fines" refers to some defined fraction of the polymer powder particles that are smaller than the average of the entire population of powder particles present in the fluid bed. Particularly small polymer particles, for example, smaller than 125 microns are considered fines.

In the fluid bed processes for the production of polyethylene and ethylene copolymers, high levels of polymer powder fines in the reactor pose significant and well known operating difficulties. Within the reactor, a higher level of fines often leads to increased agglomeration of the polymer powder. Outside the reactor, the fines may deposit in the recycle system and grow, fouling the piping, heat exchangers, compressors, and the reactor inlet gas distribution grid.

Inside the reactor, fines are a leading contributor to the formation of powder agglomerates. For various reasons, fines tend to segregate into certain poorly circulated and poorly cooled regions of the reactor. Exacerbating the segregation problem is the tendency of fines to have higher than average catalytic activity, thus tending to be hotter than the average particle. This higher catalytic activity in fines is due to higher concentrations of active catalyst components in the fines and due to short diffusion paths for monomers and for co-catalyst molecules.

One undesirable place at which fines accumulate is along the reactor vessel wall in the zone occupied by the main fluid bed. This accumulation is believed to occur because fines are more greatly affected by static forces due to their larger ratio of surface area (static charge) to mass (inertia). Thus, fines can cling by static electric forces to the electrically grounded metal wall of the reactor. Polymerization in the stagnant layer of reactor wall fines releases heat which can lead to melting and fusing of polymer into sheets along the vessel wall. These sheets of fused polymer may grow quite large before coming loose and falling into the fluid bed. Once fallen into the main fluid bed, such sheets can obstruct powder fluidization, circulation, and withdrawal. In some cases, the sheets may be so large as to significantly disrupt the normal fluidization and circulation of gas and solids of the entire fluid bed leading to extensive fusing of the main bed. When powder withdrawal slows or the bed fuses, the reactor production must be stopped and the reactor vessel opened for cleaning. This is a very costly production outage.

Another undesirable place where fines accumulate is in the disengaging section of the reaction vessel. The disengaging section of the reactor is a region of expanded cross-sectional area that is above the zone in which bed level normally resides. The purpose of the expanded area is to reduce the velocity of the fluidizing gas in order to minimize the entrainment of fine particles in the gas leaving the reactor. In the disengaging section, fines tend to concentrate in the regions of lower gas velocity nearer the downward sloping vessel wall. In fact, it is intended that most of the fines fall onto the sloped wall of the disengaging section and slide downwards and back into the main fluidized bed. However, when the concentration of fines increases in the disengaging section, the polymerization heat load on the sloped wall becomes larger. This can be observed by increasing temperatures seen from indicators placed in the sloped wall in the disengaging section. The concentration of fines and resulting heat can become great enough to lead to melting and fusing of the powder into sheets along the sloped wall. These sheets will tend to grow until their own weight and hydrodynamic forces cause them to fall into the main fluid bed, there, as discussed above, obstructing powder withdrawals and possibly causing more extensive bed fusing. As with the above, when either of these occur, the reactor production must be stopped and the reactor vessel opened for cleaning.

Several technologies are known for modification of static and of wall sheeting behavior. These include U.S. Pat. No. 4,803,251 demonstrating the addition of different compounds to the fluid bed reactor to adjust static voltage; U.S. Pat. No. 4,532,311 disclosing the use of chemicals to reduce the bonding of sheets to the reactor vessel wall; European Patent Application 0,453,116,A1 disclosing the addition of known antistatic agents to a fluid bed polyolefin reactor; European Patent Application 0,604,990,A1 disclosing the use of an electrode near the grid; and U.S. Pat. No. 5,461,123 disclosing the use of sound waves to dislodge fines from the reactor wall.

A particularly relevant discussion of the operating problems brought on by the presence of fines in the disengaging section of the reactor is contained in U.S. Pat. No. 5,428,118. This patent discloses the modification of the circulating pattern of fines in the disengaging section in order to reduce operating and product quality problems.

In addition to problems caused inside the reactor, problems are also caused by fines outside the fluid bed reactor vessel. Some fines will leave the reactor vessel in the overhead piping that carries the recycle gas away for cooling and compression. The exiting fines may attach to surfaces of piping, heat exchangers, and other process equipment in the recycle loop. Recycled fines may also settle in regions of lower gas velocity, such as the bottom of the reactor underneath the distribution grid for the fluidizing gas.

Because fines exiting the reactor retain their catalytic activity, they continue to react outside the reactor. Thus, fines depositing in the recycle system equipment grow and fuse to create skins, sheets, and lumps of polymer. These skins, sheets, and lumps reduce heat transfer efficiency and modify mass flow in the recycle gas piping and equipment. Also, some fines will return to the reactor via the recycle system. Because the temperature and gas composition are very different at some locations in the recycle system, the polymer produced outside the reactor may have very undesirable properties. Although a minute fraction of the total polymer production, the fines returning to the reactor can nonetheless seriously impact the suitability of the overall product. The presence of non-homogeneous polymer fines in the final product can significantly affect the quality of the product and resulting articles produced therefrom, such as the formation of gels in polyethylene films.

There are several disclosed methods for coping with reactive fines exiting a fluidized bed reactor. U.S. Pat. No. 4,882,400 discloses the use of cyclonic separators to remove the fines from gas exiting the reactor and the use of ejectors to return the fines to the reactor. U.S. Pat. No. 4,956,427 discloses technology for coating the surface of heat exchanger tubes to reduce the adhesion of fines and the formation of insulating polymer skins. U.S. Pat. No. 5,126,414; U.S. Pat. No. 4,933,149; and U.S. Pat. No. 5,352,749 all reveal improvements to mitigate problems with the accumulation of fines and lumps underneath the gas distribution grid in the reactor.

The above patents disclose methods of coping with the problems caused by polymeric fines only after they are produced. These references disclose various methods of preventing sheeting, through either physical, electrostatic, or chemical means of controlling the behavior of the fines. However, none of the above references discloses a method of preventing or reducing the production of fines. None of these references deal with the original problem of the formation of the fines during polymerization.

However, techniques for the modification of catalysts have been used for controlling the level of fines in the fluid bed. The size of the catalyst support, the size of the finished catalyst, the physical strength of the support and the chemical activities of the catalyst system are some of the catalyst parameters known to affect the particle size distribution in a fluid bed polyolefin reactor. Examples are given by P. Galli. in "The 'Spherilene' Process", paper S4A, *Polyethylene— The 1990s and Beyond,* The Plastics and Rubber Institute (UK), (1992) and by I. D. Burdett in "A Continuing Success: The UNIPOL Process", P 616–623, *CHEMTECH,* October 1992. Unfortunately, when the catalyst is altered, then the process parameters and polymer properties are also altered. Catalyst changes often result in a modified polymer, such as changes in the density and molecular weight distribution.

In light of the above, it would be very desirable to be able to control to a low level or to reduce the amount of fines produced in the reactor, thereby avoiding the necessity of dealing with the problems caused by the fines, but without having to modify the catalyst, thereby avoiding changes to the properties of the resulting polyethylene polymer.

SUMMARY OF THE INVENTION

The process according to the present invention entails a method for reducing or controlling the fines to a low level in a fluid bed polyethylene process which comprises: determining the fraction of polymeric fines present in the fluid bed reactor and adjusting the chemical composition of the fluidizing gas mixture; if the fraction of fines in the fluid bed of the reactor is too high, then an amount of an inert $C_3$–$C_8$ hydrocarbon is added to the fluidizing gas mixture; if the fraction of the fines is reduced below the target fraction of fines, then the amount of inert $C_3$–$C_8$ hydrocarbon added to the fluid bed reactor can be lowered.

Another process of controlling or reducing the fines to a low level according to the present invention in a polyethylene fluid bed reactor comprises measuring the amount of fines and the composition of the gas mixture in the reactor and then determining the ratio of the total reactor pressure to the dewpoint pressure of the reactor gas; if the fines level is too high and the ratio of Ptotal/Pdew is below 0.4, then an amount of inert $C_3$–$C_8$ hydrocarbon is added to the reactor to increase said ratio to at least 0.4 or above.

The overall polymerization process according to the present invention entails a process for the production of polyethylene with a controlled or reduced fraction of powder fines that comprises (1) introducing into a fluidized bed of a gas phase reactor at least one alpha-olefin, hydrogen, other fluidizing gas, catalyst, and inert $C_3$–$C_8$ hydrocarbon and determining the ratio of the total reactor pressure to the dewpoint pressure of the reactor gas such that if the ratio is below 0.4, inert $C_3$–$C_8$ hydrocarbon is introduced into the reactor, and if the ratio is above 0.99, reducing the amount of inert $C_3$–$C_8$ hydrocarbon introduced into the reactor; (2) removing a portion of the alpha-olefin, hydrogen, other fluidizing gas, inert $C_3$–$C_8$ hydrocarbon, and polyethylene produced therein; and (3) reintroducing fluidizing gas, inert $C_3$–$C_8$ hydrocarbon, alpha-olefin, and hydrogen.

Another process according to the present invention entails the control or reduction of fines to a low level in a polymerization reactor in a fluid bed polyethylene process which comprises: determining the fraction of polymeric fines present in the fluid bed reactor and adjusting the composition of the reactive chemicals in the fluidizing gas mixture; if the fraction of fines in the fluid bed of the reactor is too high then increasing the amount of the blend of ethylene/comonomer/hydrogen introduced into the reactor to reduce the production of fines, without significantly modifying the density or molecular weight of the polymer.

BRIEF DESCRIPTION OF THE DRAWINGS

FIG. 5 shows that there was not any condensed liquid in the reactor inlet gas during the same time period shown in FIGS. 3 and 4.

FIG. 6 shows the response of the average fines fraction of an operating reactor on nine successive production periods of a particular density of LLDPE when the levels of inert $C_6$ hydrocarbons were intentionally raised.

DETAILED DESCRIPTION OF THE INVENTION

Figure 1:
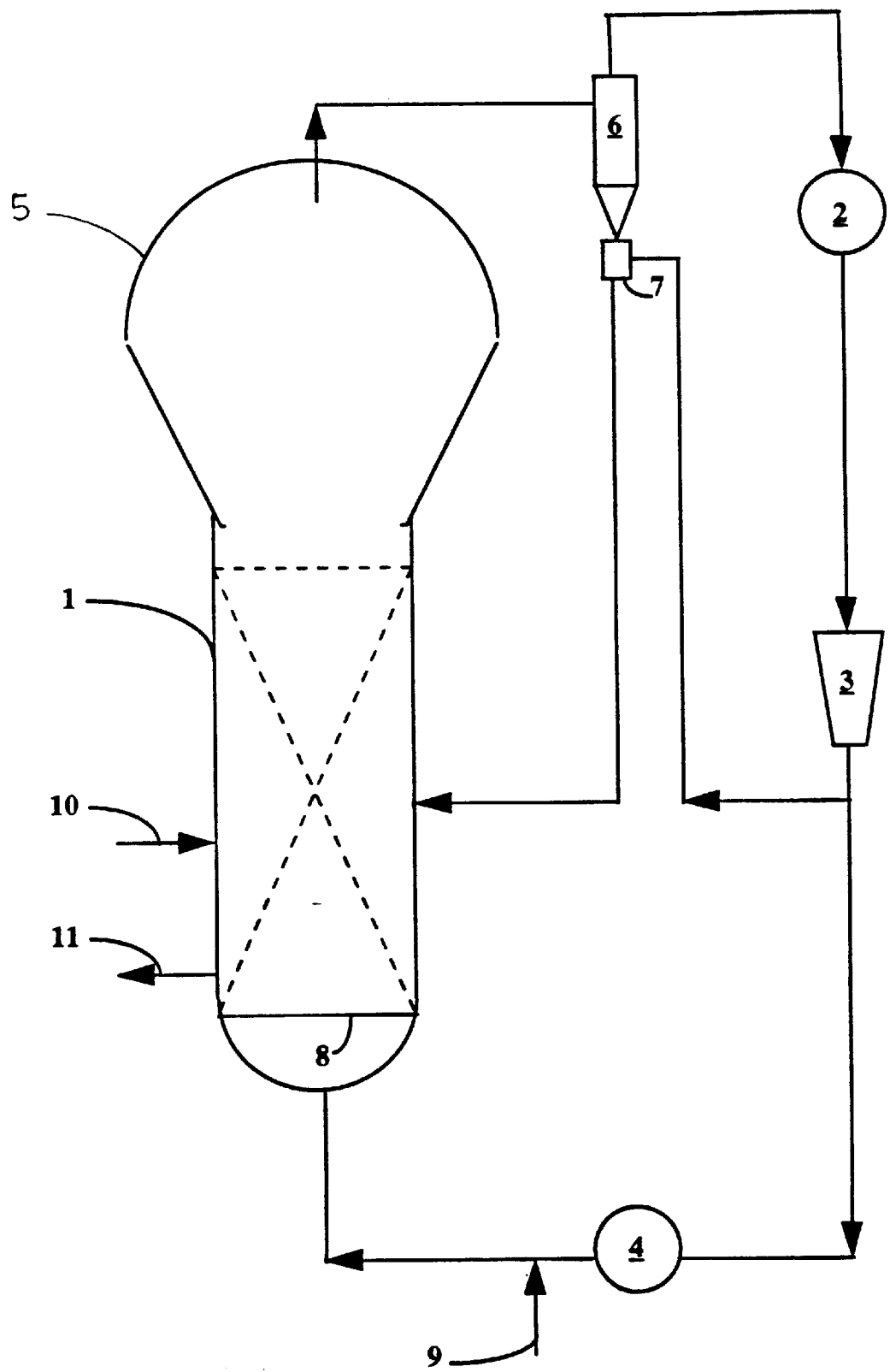
FIG. 1 shows one useful arrangement of a fluid bed polyolefin process.

The inventors have unexpectedly discovered a particularly useful and surprising method for controlling or reducing the amount of fines within a fluid bed reactor during production of polyethylene and ethylene copolymers. The inventors have unexpectedly found that by controlling the hydrocarbon composition of the fluidizing gas inside the reactor, a significant measure of control over the level of fines present in the reactor is achieved. Specifically, inert hydrocarbons are added to the circulating gas for the purpose of controlling or reducing the level of fines in the fluid bed. The invention has the advantages of permitting higher production rates without the formation of agglomerates in the reactor and of reducing the fouling of recycle stream piping and heat exchangers.

The reduction or control in reactor bed fines is obtained without significantly modifying the properties of the polymer produced. The present process permits this reduction in the amount of fines produced without the need to modify the catalyst system, either chemically or physically.

The quantitative reduction of fines achieved by the current invention varies depending on the target product grade being made in the reactor. However, the reduction of fines is frequently on the order of 50 percent, compared to operation with lower levels of inert hydrocarbons. In some cases, the reduction in the production of fines may even be greater than 50 percent.

Procedures are revealed herein for using the inert hydrocarbons singly or in combination and at differing reactor temperatures and pressures. This is an important feature of the present invention because different inert hydrocarbons can provide different levels of fines suppression and the effect can vary for any particular hydrocarbon according to the reactor temperature and pressure.

The process according to the present invention of the lowering of fines is achieved without modifying significantly the product properties. Surprisingly, the inventors have found that the level of fines can be suppressed using inert hydrocarbons in the $C_3$–$C_8$ range that do not significantly modify the properties of the target product being made in the reactor. Furthermore in contrast to the previously known processes, the current invention modifies the level of fines in the reactor, by a method not previously contemplated, without modification to the catalyst system. In many respects, control of fines without modification of the catalyst system is superior because it is difficult to change the catalyst system without affecting the properties of the polyolefin produced, and the current invention reduces the amount of fines without measurably changing product properties.

The inventors have also discovered that the lowering of fines occurs without regard to whether or not liquids are condensed in the fluidizing gas recycle stream. The higher levels of inert hydrocarbons change the heat capacity and dewpoint of the fluidizing gas. Depending on reactor heat load and the flow of fluidizing gas, some liquids may be produced during cooling of the recycle stream, and various methods are known for returning these liquids to the reactor. However, the inventors have discovered that the suppression of fines using inert hydrocarbons works similarly both with and without the addition of liquids to the fluid bed.

In contrast to technologies that seek to cope with the existence of fines in a fluid bed polyolefin reactor, the current invention controls or reduces the quantity of fines to a low level in the fluid bed and in the recycle stream by a method not previously contemplated. In many respects, the actual reduction of fines is a superior method for avoiding operating problems. The current invention speaks to the root cause of a problem rather than providing a method that merely compensates for an elevated level of fines.

Without being bound to any particular theory for the function and efficacy of the invention, the inventors believe that absorption of the hydrocarbons into the growing polymer powder may be an operative physical phenomena that permits the reduction in the production of fines during polymerization.

Figure 2:
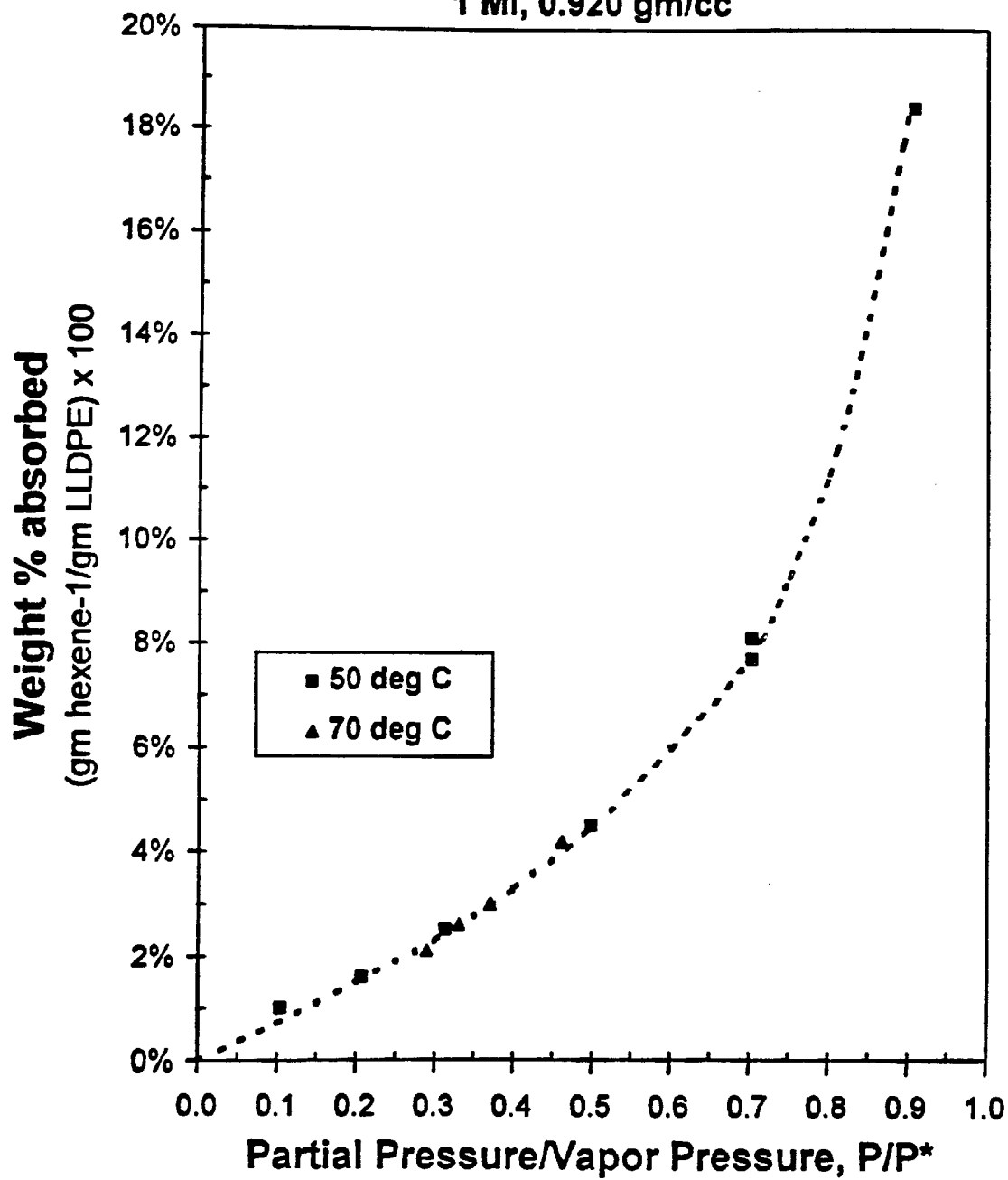
FIG. 2 shows the absorption of hexene-1 into particles of a linear low-density polyethylene (LLDPE), an ethylene/hexene copolymer sample, at two temperatures and at various concentrations of hexene-1 gas around the polymer.

Ethylene copolymers can absorb considerable amounts of hydrocarbon. This absorption is observed to be a function, primarily, of the density of the polymer and of the concentration of the hydrocarbon in the vapor phase around the polymer. At low levels of vapor concentration, absorption of hydrocarbon tends to be a linear function of vapor concentration. At higher levels of vapor concentration, the absorption typically becomes quite non-linear as shown in FIG. 2 and explained in Example 1. For example, a linear low density polyethylene (LLDPE) with a density of about 0.920 gram per cubic centimeter may absorb upwards of 20 percent of its own weight when placed in contact with a liquid hydrocarbon. This behavior is widely reported in the open literature; one thorough review is given by R. A. Hutchinson and W. H. Ray in "Polymerization of Olefins through Heterogeneous Catalysis. VIII. Monomer Sorption Effects", *Journal of Applied Polymer Science*, Vol. 41, 51–81 (1990).

Absorption of hydrocarbon into the polyethylene is observed to modify the polymer physically by swelling and plasticizing it. At an elementary level, this may be studied by feel, sight and even sound when as little as 4 weight percent $C_6$ is absorbed into a powder sample in a glass jar at room temperature and pressure. Again, without wishing to be bound to a specific theory, the inventors suggest that plasticizing of the polymer powder may perhaps be a fundamental behavior behind the benefits of the current invention. Plasticization may make the powder more resistant to breakage, or it may even permit some particles to re-agglomerate.

Absorption of hydrocarbon may also buffer temperature swings in the growing particles. Although fluid bed polymer processes have a high degree of temperature uniformity within the powder bed, nonetheless there are regions of unequal temperature in the reactor, notably near the recycle stream inlets, along the vessel walls, and in the disengaging section above the main fluid bed. Additionally, there are thermal gradients within individual particles when they are actively producing new polymer.

The equilibrium absorption of hydrocarbons into ethylene copolymers decreases with increasing temperature, and the desorption process involves a latent heat that is similar to the cooling produced by simple evaporation. Thus, when particles tarry in a hot region of the reactor and begin to overheat, some hydrocarbon will desorb from the powder causing a cooling effect. Conversely, when particles circulate into the cool zone above the recycle gas inlet grid, there will be a rise in hydrocarbon absorption, producing a latent heat of absorption that will serve somewhat to counteract the cooling of the recycle stream. Again without wishing to be bound by theory, it is possible that increased levels of absorption provide increased thermal buffering to mitigate temperature swings within individual particles. This will, in turn, dampen thermally driven activity swings and thermally induced stresses in the particles, perhaps reducing their tendency to fracture and form fines.

The absorption interpretation has allowed the inventors to develop a more sophisticated approach for setting the level of inert hydrocarbon used to reduce fines. This method takes into account different reactor temperatures, pressures, and more widely varying gas phase compositions. Absorption in the polyethylene depends upon the thermodynamic activity of the surrounding hydrocarbon phase. For a pure component, such as hexene-1 or n-hexane, this activity may be approximated by the partial pressure Pi of the specific hydrocarbon, divided by its vapor pressure at the particular temperature, Pi*. As the temperature changes, vapor pressure Pi* changes, higher temperature giving higher vapor pressure and lower absorption as shown in FIG. 2 and Example 1.

The effect of mixtures of different hydrocarbons can be predicted by summing the individual Pi/Pi*, thus calculating $\Sigma(Pi/Pi^*)$. The inventors have found that useful reductions in fines can be obtained by raising the total hydrocarbon level to ensure that the $\Sigma(Pi/Pi^*)$ for all components in the reactor gas is above 0.4.

In Example 2 below, the inventors initially used a simple method for monitoring the amount of $C_6$ hydrocarbon in a reactor. The partial pressure is summed for all $C_6$ compounds, including both alpha-olefin and inert compounds, in the reactor gas phase. As this summed partial pressure is raised, the increasingly higher levels of hydrocarbons tend to give even lower concentrations of fines. The summed partial pressure of heavier hydrocarbons is the simplest method for predicting the onset and magnitude of fines reduction.

A preferred embodiment of the present invention is to add intentionally to the reactor gas phase hydrocarbons in the $C_3$ to $C_8$ range, which are inert with respect to the polymerization, to increase (Pi/Pi*) at least above 0.4, and preferably as high as possible subject to other process constraints, thereby improving process operation with respect to agglomeration and fouling from the reactive powder fines of polyethylene and ethylene copolymers.

As the sum of the Pi/Pi* increases above 0.4 up to near 1, the amount of hydrocarbon absorbed in the polymer continuously increases. When the polymer product is removed from the reactor, the absorbed hydrocarbon must be removed and recycled. Thus, the higher the Pi/Pi* the more hydrocarbon there is that must be desorbed and recovered. This absorbed hydrocarbon also can interfere with the powder flowability and powder fluidization. Therefore, if the control or reduction of fines is adequate, the amount of hydrocarbon added to the system should not be arbitrarily increased further.

A more accurate prediction for absorption into polyethylene from complex mixtures of reactor gas can be obtained by finding the ratio of the reactor pressure to the dewpoint pressure for the gas composition and temperature in the reactor. Changing the amount of $C_3$ to $C_8$ inert hydrocarbons will change the dewpoint pressure. Higher loading of heavy hydrocarbons will reduce the dewpoint pressure and will cause Ptotal/Pdew to rise. The inventors have unexpectedly found that useful reductions in fines can be obtained when Ptotal/Pdew in the reactor is raised above 0.4. This Ptotal/Pdew should not rise to be equal to one or greater, because this means that liquid would be present in the reactor overhead gas flow. This is undesirable because then the reactor commences to fill with liquid. This ratio of Ptotal/Pdew is preferably monitored and maintained between 0.4 and 0.99, more preferably between 0.5 and 0.95 with a ratio between 0.6 and 0.9 being most preferred.

The inert hydrocarbon used in the process according to the present invention can be any hydrocarbon that is inert under the polymerization reaction conditions, and can also include non-alpha-olefins, such as hexene-2, if they are inert with the catalyst system in use. The inert hydrocarbons are $C_3$–$C_8$ hydrocarbons, preferably $C_4$ to $C_6$ with the $C_5$–$C_6$ hydrocarbons being most preferred. Suitable examples of saturated, inert hydrocarbons include n-butane, isobutane, 2,2-dimethyl propane, isopentane, n-pentane, n-hexane, cyclohexane, 2-methylpentane, 2,3-dimethylbutane, 2,2-dimethylbutane, 3-methylpentane, and methylcyclopentane. The $C_5$–$C_6$ inert hydrocarbons are more preferred, since these give the best balance between volatility, allowable partial pressure, and absorption.

Because the invention works without modifying the preparation or strength of the catalyst, including any inorganic support structure such as $MgCl_2$ or silica, and because the invention works without altering the product properties set by the catalyst system, the invention is not dependent on the specific type of catalyst system. The level of benefit obtained may depend upon the base level of fines inherent with the specific catalyst system in use, but the general utility of the invention results from the interaction of the hydrocarbons in the gas phase with the polyethylene, not with the catalyst used to produce it.

The inventors have discovered that with a particular catalyst system with an inherent base level of fines, that as the density is decreased by increasing the ratio of comonomer to ethylene, then the level of fines produced in the reactor also tends to decrease. However, operating problems caused by fines depend upon the particular polymer characteristics as well as their amount. For example, a level of fines which permits good operation at a polyethylene density of 0.952 gram/cc can produce severe behavior at a lower product density of 0.930 gm/cc.

The inventors have discovered that the fines produced in a fluid bed polyethylene reactor operating in the density range of 0.94 to 0.91 gram/cc, though reduced in quantity compared to higher densities, produce significant operating difficulties. This may be due to the fact that the polymer becomes softer and stickier as the density is reduced. Whatever the cause, the inventors have discovered that the present invention is surprisingly and particularly useful when the polyethylene product density is in the range of 0.94 to 0.91 gram/cc, with more particular benefits in the range of 0.94 to 0.92 gram/cc and most improved results in the range of 0.935 to 0.922 gram/cc.

In order to produce a lower density polyethylene product, the ratio of comonomer to ethylene is increased, often by keeping ethylene near constant and increasing the fraction of comonomer in the reactor gas phase. The presence of additional comonomer causes increased incorporation of the heavier olefins in the ethylene copolymer, and this lowers the density of the product powder. As noted above, lower densities usually exhibit lower levels of fines. Since the flexibility and melting behavior of an ethylene copolymer change when the density is lowered, the density may itself be supposed to control the amount of fines present in the fluid bed.

However, the inventors have unexpectedly discovered that the comonomer in a fluid bed polyethylene process can be used, according to the present invention, to reduce the production of fines without altering to a significant extent the density of the polymer. This can be accomplished by increasing the total blend of monomer, e.g. ethylene and hexene, such that the density remains the same while increasing the P/P* or Ptotal/Pdew to be within the range required according to the present invention. This aspect of the present invention has it's limitations, and when the comonomer is butene-1, the reduction in fines may not be sufficient, or may be constrained by the amount of total ethylene present in the reactor. Thus, this aspect of the present invention is useful for $C_3$ to $C_8$ olefin comonomers, but the preferred embodiment is with $C_5$ to $C_6$ olefin comonomers.

As used herein, the term ethylene polymers, ethylene copolymers, or polyethylene also includes copolymers composed of ethylene and one or more other olefins (comonomer). These other olefins are preferably alpha-olefins. Also included in this definition of polymers are terpolymers of ethylene and two or more comonomers. Examples of suitable alpha-olefins include, but are not limited to, propylene, butene-1, pentene-1, hexene-1, 4-methylpentene-1, and octene-1, with hexene-1, 4-methylpentene-1, and butene-1 being most preferred. These ethylene copolymers, are in most instances linear, and are referred to as linear low-density polyethylene (LLDPE) at densities below 0.94 g/cc.

As used herein, the term "fines" refers to some defined fraction of the powder particles that are smaller than the average of the entire population of powder particles present in the fluid bed. There are many convenient methods for measuring the size distribution, and any of these can used to practice the present invention. Similarly, the definition of how large a particle remains a fines is somewhat arbitrary though it would not typically be chosen to include more than one-half, and preferably less than one-quarter, and most preferably less than one-tenth of the total particle population. The choice of measurement method and size definition can be made for any number of simple reasons, but it is generally based upon cost and reproducibility.

Key elements in the reactor loop for a preferred polyethylene process are illustrated in FIG. 1 and include the reactor vessel 1, heat exchangers 2 and 4, compressor 3, fines cyclone 6, and fines return injector 7. A gas distributor plate 8 is provided near the bottom of the reactor. An enlarged disengaging zone 5 is provided near the top of the vessel for reducing the entrainment of solids in the exiting gas. Various schemes are used for replenishing the ethylene, comonomer, hydrogen, and inerts in the main gas recycle system. These are depicted in FIG. 1 as a single combined stream 9 for simplicity. Catalyst injection, in the form of prepolymer, is shown by stream 10, and polymer powder discharge is shown as stream 11.

Additionally, during start-up of the reactor, a high amount of fines can be produced. The production of this amount of fines can be reduced by adding inert hydrocarbon according to the present invention.

The following examples are intended to illustrate the present invention, and are not intended to be interpret as a limitation upon the reasonable scope thereof.

EXAMPLES

As used in the art, the term "fines" refers to some defined fraction of the powder particles that are smaller than the average of the entire population of powder particles present in the fluid bed. As an arbitrary matter of convenience, the data presented in the Examples herein consider fines to be the percentage of particles smaller than 125 microns in diameter as measured with a laser diffraction meter, Malvern Series 2600, available from Malvern Company. A different size definition, of say 80 microns, or a different measurement method, such as sieving, would serve equally well to show the effects of the invention and to correlate with the improved operation afforded by the invention.

Example 1

This example illustrates absorption of hexene-1 in a linear low-density polyethylene. The polyethylene used was a copolymer of ethylene and hexene-1 with a nominal melt index of 1 gram/10 minutes (ASTM Test Method D1238 Condition E), and a nominal density of 0.920 gram per cubic centimeter. The polymer sample was placed on a microgram balance inside a thermostated, isothermal vacuum chamber, which was fully evacuated. Then, various pressures of hexene-1 vapor were admitted to the vapor space, and the weight change in the polymer sample was noted. This weight change was corrected for buoyancy in the vapor phase, and converted to a weight percent absorbed in the polymer. The experiment was performed at two different temperatures, 50° C. and 70° C. The results plotted in FIG. 2 show the weight percent absorption on the Y-axis plotted against the ratio of the partial pressure of the hexene-1 divided by the vapor pressure of the hexene-1 on the X-axis. This ratio of partial pressure to vapor pressure may be represented as P/P*. It will be noted that the absorption of hexene-1 into the polymer approaches 20%, as the pressure of hexene-1 in the vapor phase approaches the vapor pressure of liquid hexene at the temperatures studied. When the ratio of P/P* reaches 1, there would be liquid hexene-1 present. It will be noted that dividing the partial pressure in the vapor phase by the vapor pressure appears to normalize the results from the two experiments at 50 and 70° C. onto a common response curve. This means that as the polymer sample becomes hotter, the pressure of the hexene-1 in the vapor phase must become much higher to produce an equivalent absorption in the polymer. This normalization using vapor pressure provides a useful tool to estimate the absorption behavior of the hydrocarbon at different temperatures not studied.

Example 2

Figure 3:
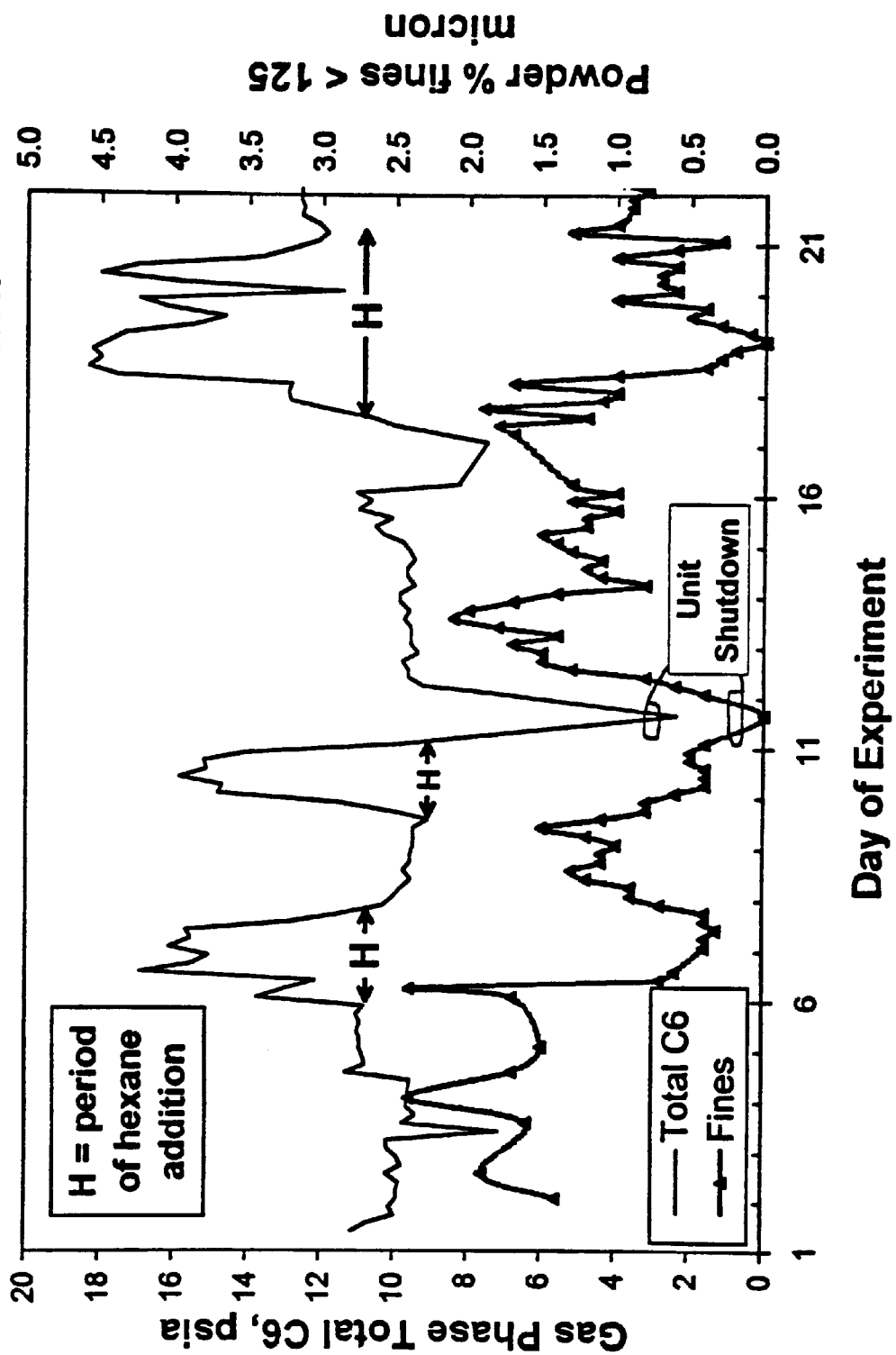
FIG. 3 shows the response of the amount of fines fraction in an operating reactor while raising and lowering the amount of inert $C_6$ hydrocarbons in the fluidizing gas with all other conditions remaining essentially constant.
Figure 4:
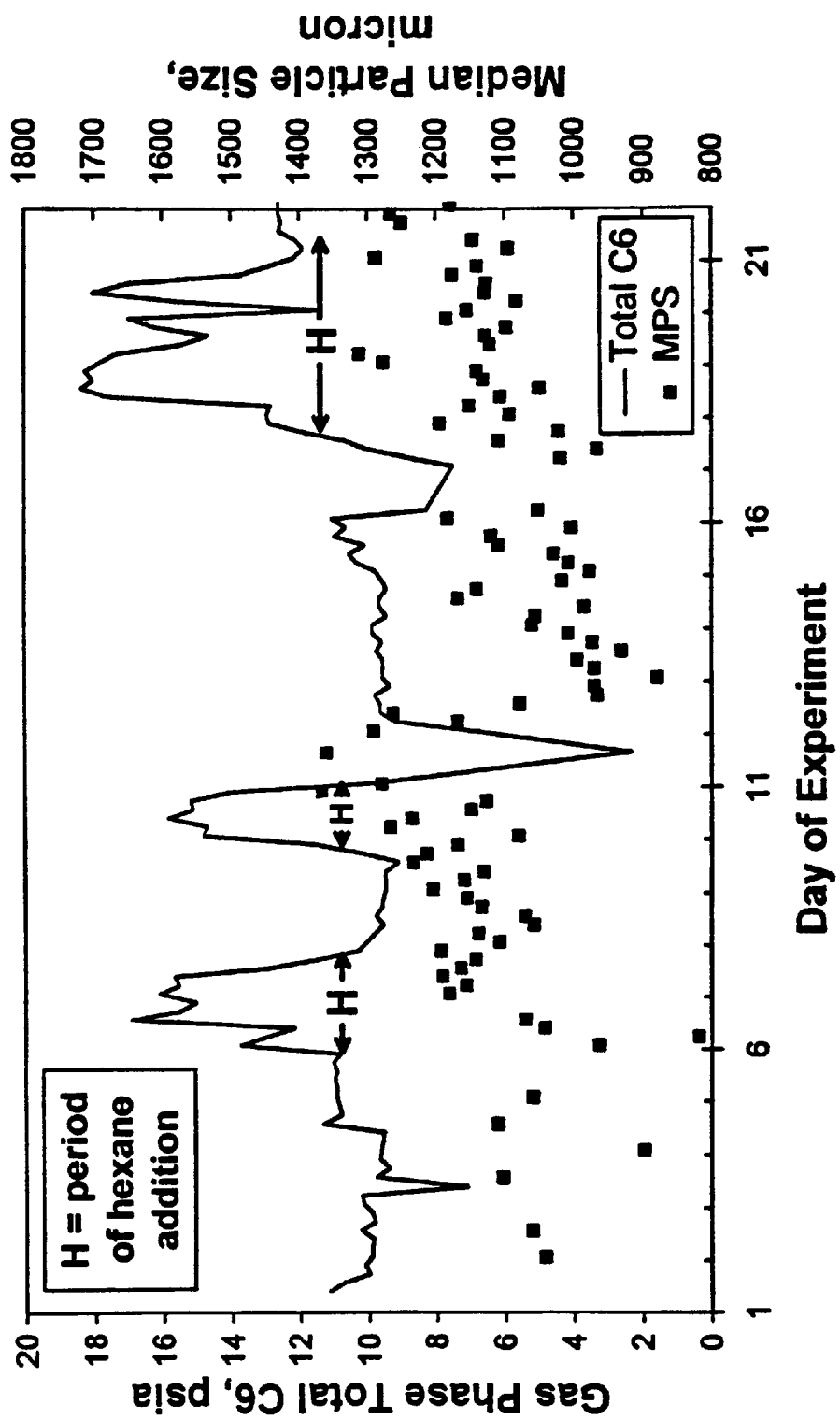
FIG. 4 shows the response of the median particle size during the same period of reactor operation as FIG. 3.

An experiment was conducted in a research scale fluid bed reactor unit with a reactor diameter of about 29 inches (74 cm). The polymer produced was an ethylene copolymer with hexene-1. The nominal density was controlled at 0.924 gram per cubic centimeter throughout the experiment by small adjustments in the ratio of hexene-1 to ethylene. The nominal melt index was controlled at 0.9 gram/10 minutes throughout the experiment by small adjustments in the ratio of hydrogen to ethylene. The reactor temperature was controlled near 84° C. and pressure was held near 290 Psig (2.00 MPa). Polymer production averaged about 160 pounds per hour (73 kg/hr) with an average residence time of about 3.4 hours during the test. Reactor gas composition included about 24 mole percent ethylene and about 4.4 mole percent hydrogen. The partial pressure of hexene-1 was about 3.2 mole percent, 10 psia (0.069 MPa). The summed partial pressure of all $C_6$ hydrocarbons is shown in FIG. 3, 4, and 5. The inert $C_6$ hydrocarbon can be found by subtracting the baseline of hexene-1. There was a trace of ethane and the balance of the reactor gas was mostly nitrogen. The other particulars of the fluid bed process and the Ziegler catalyst are generally according to Example 2 in U.S. Pat. No. 4,882,400, which is incorporated here in its entirety by reference.

The injected hexane was a commercial grade composed of approximately 86 mole percent n-hexane, 10 mole percent methylcyclopentane, and 4 mole percent 3-methylpentane. The source of the hexane injected on days 6 and 10 was from the hexane storage facility of an operating fluid bed polyethylene unit. The source of hexane for the third injection sequence commencing on day 18 was directly from a supplier's truck shipment before unloading the balance of the shipment to the commercial polyethylene unit. The hexane for the third trial was dried over 3A molecular sieves. The hexane for the first two trials had been dried by distillation in the commercial polyethylene unit.

The results show that addition of hexane reliably and reproducibly suppresses the level of fines present in the fluid bed beginning within two (2) turnovers of the bed. The fines rapidly reduce to drop below 50 volume percent of the original fines after a hexane partial pressure of about 6–8 psia is added to the reactor (See FIG. 3). Furthermore, the level of fines is seen to rise when addition of the hexane is stopped. Supporting the reduction in fines is evidenced by an increase in the particle size of the total powder, as illustrated in FIG. 4. The median particle size in microns was increased from 1,000 to over 1,100 after hexane was added.

Before addition of the hexane, (Pi/Pi*) approximately equals (10 psia/26.9 psia)=0.37. With the supplemental 6 psia of hexane, (Pi/Pi*) approximately equals 0.37 plus (6 psia/23.1 psia)=0.37+0.26=0.63.

In spite of the elevated level of C6 in the gas composition, resulting from injection of hexane, the temperature of the cold gas returning to the base of the reactor never dropped down below the dewpoint of the mixture. That is, there was never any liquid condensed in the recycle stream. FIG. 5 shows a brief excursion down to a 6° C. margin between the dewpoint and the temperature of the cold gas returning to the reactor, but the usual margin was over 10° C.

Example 3

This example is a calculation to illustrate how to calculate the required amount of hexane addition to achieve a similar fines reduction at two different temperatures. For n-hexane at 80° C., the vapor pressure is about 20.6 psia (0.142 MPa). At 86° C. the vapor pressure of n-hexane is about 24.5 psia (0.169 MPa). To achieve similar fines reduction behavior, about 19 percent more n-hexane is estimated to be required in the gas phase at 86° C. than at 80° C.

Example 4

This example is a calculation to illustrate how to estimate equivalent amounts of different inert hydrocarbons. For 6 psia (0.041 MPa) of n-hexane at 84° C., Pi/Pi* equal to 6/23.1=0.26. For a similar reduction in fines, only slightly less hexene-2, which is sterically hindered from reacting when using conventional Ziegler catalysts, is needed. An equivalent reduction is predicted with about 5.9 psia (0.041 MPa) since the vapor pressure of hexene-2 is 22.7 psia (0.157 MPa) at 84° C. A lighter hydrocarbon such as isopentane would require a higher partial pressure of about 17 psia (0.117 MPa) to achieve a similar reduction in fines.

Example 5

The following example pertains to commercial production of an ethylene copolymer with hexene-1. This example was conducted in a commercial reactor as illustrated in FIG. 1. Key elements in the reactor loop are the reactor vessel 1, heat exchangers 2 and 4, compressor 3, fines, cyclone 6, and fines return injector 7. A gas distributor plate 8 is provided near the bottom of the reactor. An enlarged disengaging zone 5 is provided near the top of the vessel for reducing the entrainement of solids in the exiting gas. Various schemes are used for replenishing the ethylene, comonomer, hydrogen, and inerts in the main gas recycle stream. These are depicted in FIG. 1 as a single combined stream 9 for simplicity. Catalyst injection, in the form of prepolymer, is shown by stream 10, and polymer powder discharge is shown as stream 11.

The nominal density of the copolymer was controlled near 0.925 gram per cubic centimeter. The nominal melt index was controlled near 0.9 gram/10 minutes, and the operating conditions varied in a narrow range. The data occurred over many month's time, during different campaigns when this particular type of polyethylene was produced. The reactor temperature was 78 to 82° C. and the pressure was about 300 psig (2.07 MPa). Superficial fluidization velocity varied from 1.6 to 2.0 feet per second (49 to 61 cm/sec). Ethylene varied from 24 to 36 mole % of reactor gas composition, with the hexene-1 and hydrogen adjusted to control product density and molecular weight, respectively. The hexene-2 composition in the reactor gas was controlled by adjusting the level of purge, since the hexene-2 is an impurity in the hexene-1 feed. The level of saturated $C_6$ hydrocarbons was adjusted by intentional injection of commercial hexane of the composition described in Example 2. The other particulars of the fluid bed process and the Ziegler catalyst are generally according to Example 2 in U.S. Pat. No. 4,882, 400.

FIG. 6 shows the reduction in bed fines, as the level of total $C_6$ was raised over a period of months on 9 successive but separate production campaigns of the same product. As the sum of all $C_6$ partial pressures was raised above 18 psia (0.124 MPa) from about 12 psia (0.083 MPa), the level of fines, defined as the fraction of the powder less than 125 microns, declined from about 1.6% to about 0.8%.

The commercial unit sifts agglomerates from the powder withdrawn from the reactor using a screen with openings of 7/16 inch square (1.1 cm square). When the fines were reduced, the production of agglomerates from the screener declined from values above 100 pounds per hour (45 kg/hr) on campaign 1 to values below 2 pounds per hour (1 kg/hr) on subsequent campaigns, even though the production rate for the unit was increased over 50%. Normally, agglomerate production is observed to increase at higher production rates because the reactor is being pushed to higher reaction per unit volume per unit time (space-time yield).

We claim:

1. A process for reducing or controlling the fines in a polyethylene fluid bed reactor to produce a polyethylene product comprising maintaining the ratio of the total reactor pressure to the dew point pressure of the reactor gas between 0.4 and 0.99 by adding an amount of inert $C_3$–$C_8$ hydrocarbon to the reactor.

2. The process according to claim 1 wherein the inert hydrocarbon is a $C_4$–$C_6$ hydrocarbon.

3. The process according to claim 1 wherein the polymer is an ethylene alpha-olefin copolymer wherein the alpha-olefin is selected from $C_3$ to $C_8$ alpha-olefins.

4. The process according to claim 1 wherein the ratio of the total reactor pressure to the dewpoint pressure of the reactor gas is maintained between 0.5 and 0.95.

5. The process according to claim 4 wherein the ratio of the total reactor pressure to the dewpoint pressure of the reactor is maintained between 0.6 and 0.9.

6. The process according to claim 1, wherein the polyethylene product density is between 0.94 and 0.91 g/cc.

7. The process according to claim 1, wherein the polyethylene product density is between 0.935 and 0.922 g/cc.

8. A polyethylene fluid bed reactor process for the production of a polyethylene product, with a controlled or reduced fraction of powder fines, comprising:

(1) introducing into a fluidized bed of a gas phase reactor at least one alpha-olefin, fluidizing gas, hydrogen, catalyst, and inert $C_3$–$C_8$ hydrocarbon and measuring the ratio of the total reactor pressure to the dewpoint pressure of the reactor gas, such that when said ratio is below 0.4, inert $C_3$–$C_8$ hydrocarbon is introduced into the reactor, and when said ratio is above 0.99, reducing the amount of inert $C_3$–$C_8$ hydrocarbon introduced into the reactor;

(2) removing a portion of the alpha-olefin, fluidizing gas, inert $C_3$–$C_8$ hydrocarbon, and polyethylene produced therein; and (3) reintroducing fluidizing gas, inert $C_3$–$C_8$ hydrocarbon, and alpha olefin.

9. The process according to claim 8, wherein the polyethylene product density is between 0.94 and 0.91 g/cc.

10. The process according to claim 8, wherein the polyethylene product density is between 0.935 and 0.922 g/cc.

11. In a process for the reduction of fines in a polymerization reactor of a fluid bed polyethylene process to produce a polyethylene product wherein a blend of ethylene and $C_5$ or $C_6$ olefin comonomer is added to said reactor, the improvement comprising increasing the amount of $C_5$ or $C_6$ olefin comonomer added to said reactor and maintaining the ratio of total reactor pressure to dew point pressure between 0.4 and 0.99 without significantly modifying the density or molecular weight of the polymer.

12. The process according to claim 11, wherein the polyethylene product density is between 0.94 and 0.91 g/cc.

13. The process according to claim 11, wherein the polyethylene product density is between 0.935 and 0.922 g/cc.

* * * * *